Sept. 23, 1941.  C. R. CARLIN  2,256,516
BLEEDER FITTING FOR BRAKE CYLINDERS
Filed June 11, 1940
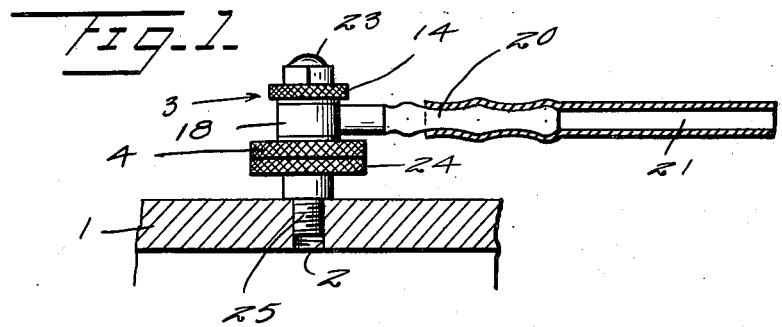
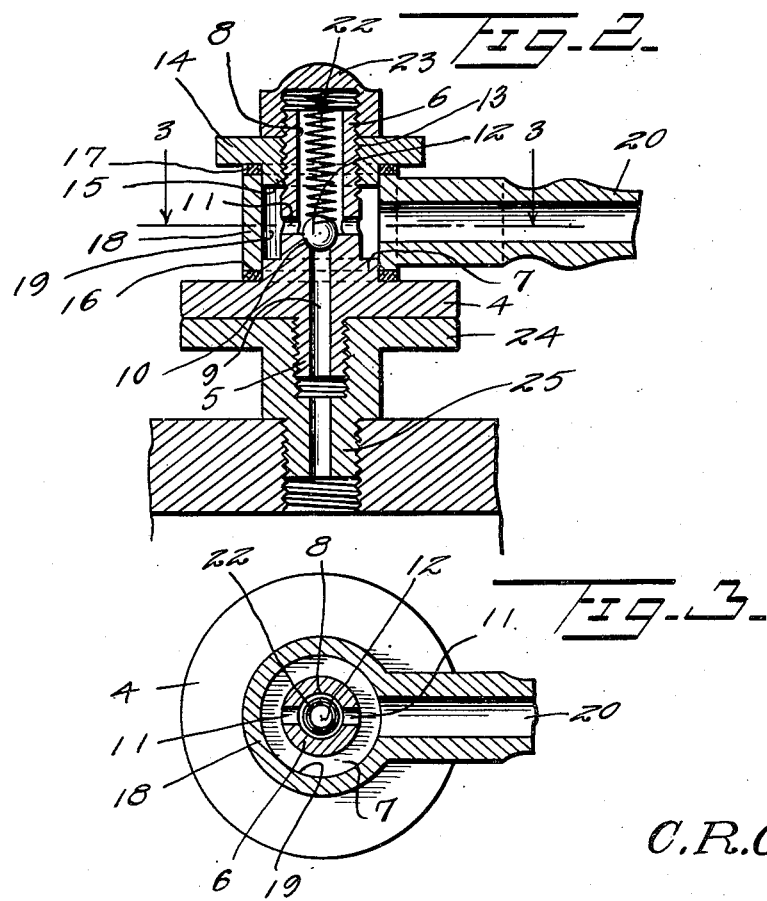
Inventor
C.R.Carlin
By Watson E. Coleman
Attorney Patented Sept. 23, 1941

2,256,516

UNITED STATES PATENT OFFICE 2,256,516

BLEEDER FITTING FOR BRAKE CYLINDERS

Charles Robert Carlin, Brunswick, Ga.

Application June 11, 1940, Serial No. 339,939

1 Claim. (Cl. 137—69)

This invention relates to the class of hydraulic brakes for motor vehicles and pertains particularly to improvements in fittings for facilitating the bleeding of air from the brake line.

The present invention has for its primary object to provide an improved swivel type of bleeder fitting for connection with a vehicle hydraulic brake cylinder to facilitate the bleeding of air therefrom as the cylinder and brake system are being filled with fluid, the present fitting being designed particularly to enable the operator to tightly connect the fitting with the brake cylinder and at the same time adjust the air outlet in the most advantageous position for the extension of a bleed hose therefrom into a fluid receiving receptacle.

Another more specific object of the invention is to provide a bleed fitting for the purpose described wherein the outlet nipple for the fitting, with which a bleeder hose is connected, is swivelly coupled with the fitting so as to facilitate its ready rotation into any desired position after the fitting has been secured tightly in the bleed aperture in the wall of the fluid brake cylinder.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appened claim.

In the drawing:

Fig. 1 is a view illustrating in side elevation the device embodying the present invention, showing the same applied.

Fig. 2 is a vertical sectional view through the fitting.

Fig. 3 is a horizontal section on the line 3—3 of Fig. 2.

In the drawing, the numeral 1 designates a portion of a vehicle hydraulic brake or fluid brake cylinder which has the usual wall aperture 2 which constitutes the air bleeding opening for the cylinder and which is closed during the operation of the brake system by a removable plug (not shown).

The swivel air bleed fitting embodying the present invention is indicated as a whole by the numeral 3 and comprises a main body 4 which is preferably in the form of a disk having a knurled peripheral surface and having extending axially from one side thereof a nipple 5 which is exteriorly threaded and which is designed for threaded engagement in the bleed opening 2.

Upon the opposite side of the body 4 from the nipple 5, there extends axially with respect to the body, the relatively long stem 6 which at its inner end is encircled by the surrounding shoulder 7. A chamber 8 is formed from the outer end of the stem 6 inwardly to substantially the plane of the shoulder 7 where it merges with the tube or small bore 9, forming a seat for a ball check 10. The inner end of the chamber 8 communicates with lateral ports 11 which open across the chamber 7. Upon the seat 10 is a ball check 12 which closes the inner end of the bore 9 and serves to prevent air or other fluid from passing into the bore 9 from the adjacent chamber or from the ports 11.

The stem 6 is exteriorly threaded, as indicated at 13, and is designed to have threadably engaged upon its outer end a threaded nut 14, which is knurled around its outer edge, as shown, and which upon its inner face is provided with the annular shoulder 15 which is of the same overall diameter as the shoulder 7.

Disposed against the inner face of the body 4 and encircling the shoulder 7 is a washer 16 and a similar washer 17 is disposed against the inner face of the nut 14 in encircling relation with the shoulder 15.

Encircling the stem and the two shoulders 7 and 15 is a cylinder 18, the ends of which are engaged by the washers 16—17 and the cylinder may be secured against rotation around the stem by threading the nut 14 inwardly so as to grip the cylinder between the nut and body and the washers as illustrated.

The interior diameter of the cylinder 18 is slightly greater than the overall diameter of the shoulders 7—15, so that the shoulders engage within the ends of the cylinder and there is thus formed between the shoulders and the inner wall of the cylinder, the annular fluid area 19. This area is in communication with the ports 11.

The cylinder 18 has a corrugated hose tube or nozzle 20 connected therewith which opens through the wall thereof to the interior for communication with the chamber 19. A rubber or other flexible tube 21 is joined to the nozzle 20 to receive fluid which may escape from the cylinder through the bore 9 and past the ball check 12.

The ball check 12 is normally pressed onto its seat by the expansion spring 22 which is positioned within the chamber 8 of the stem and which is held in place and under tension by the cap nut 23. In addition to holding the spring 22 in place, this cap nut functions as a locking means for the nut 14.

The numeral 24 designates an adapter body into which the nipple 5 may be threaded and which has a passage extending therethrough and through an exteriorly threaded nipple 25 which is of different diameter from the nipple 5. This adapter 24 may be employed for connecting the nipple 5 with an outlet or air bleed aperture of a cylinder where such aperture is not of the right size to directly receive the nipple 5.

In the employment of the present bleeder fitting, the operator removes the air bleed plug in the break wheel cylinder and screws into the aperture 2 the nipple 5 or the nipple 25 of the adapter 24 after securing the nipple 5 to the adapter. Assuming that the nipple 5 is threaded directly into the air bleed aperture, the operator may then screw up the fitting until the body 4 is brought tightly into position against the cylinder. By loosening the nut 23, the knurled nut 14 may be backed off slightly to give turning clearance for the part or cylinder 18 and the nut 23 may then be tightened up to hold the knurled nut 14 in this position. This allows the nipple to have swivel movement while maintaining a tight or leak-proof connection with the opposed members 4 and 14 and with the shoulders 7 and 15, and permits the nipple to be positioned to extend in any direction desired for the extension of the hose to a suitable receptacle. After positioning the hose as desired, the operator may extend its free end into a suitable jar for the purpose of catching any waste fluid which may escape past the ball check 12, by way of the bore 9 and the ports 11 into the chamber 19, during the operation of the vehicle brake actuating pedal for the purpose of forcing fluid from the master cylinder into the lines and into the brake cylinders.

What is claimed is:

An air bleeder fitting, comprising a circular body, a nipple extending axially from one side of the body, a stem extending axially from the other side of the body, the nipple being threaded for engagement in the air bleed aperture of a brake cylinder, the nipple having a bore extending longitudinally therethrough from its end beyond the body and into the stem, a circular shoulder encircling the stem upon the top of the body between the latter and said port, a nut threaded upon said stem and having a circular shoulder of the same diameter as the first shoulder and in opposed relation therewith, a washer encircling each of said shoulders, a chamber formed through the stem and communicating with said bore, a lateral port through the wall of said stem communicating with said chamber, a check valve in the inner end of the chamber closing communication between the port and the bore, spring means in the chamber maintaining said check valve closed, a cylinder encircling the stem and having said shoulders engaging in and closing its ends, said nut when threaded upon the stem binding the cylinder between said washers, the inner wall of the cylinder being spaced from the stem between the shoulders to form an annular chamber communicating with said port, means for connecting a tube with the cylinder for communication therethrough with said annular chamber, and a cap nut threaded upon said stem and maintaining said spring within the stem chamber.

CHAS. ROBERT CARLIN.